R. P. & W. H. CLARK.
AUXILIARY SPRING FOR USE ON AUTOMOBILES.
APPLICATION FILED JULY 22, 1913.
1,094,305.   Patented Apr. 21, 1914.
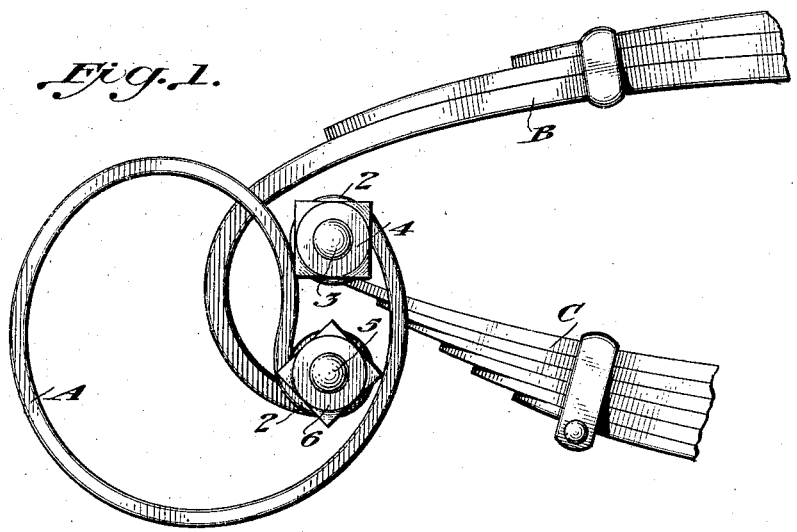
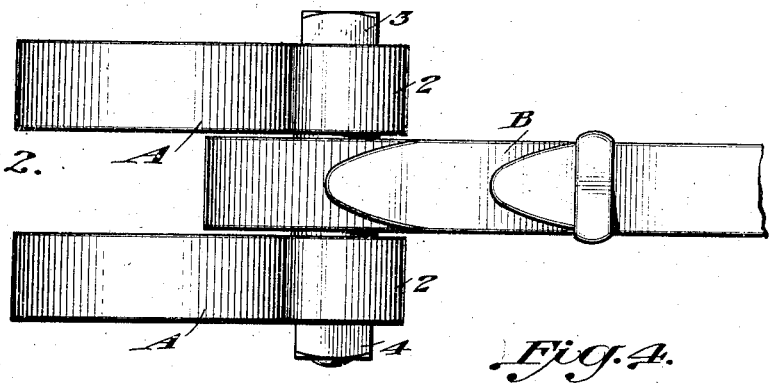
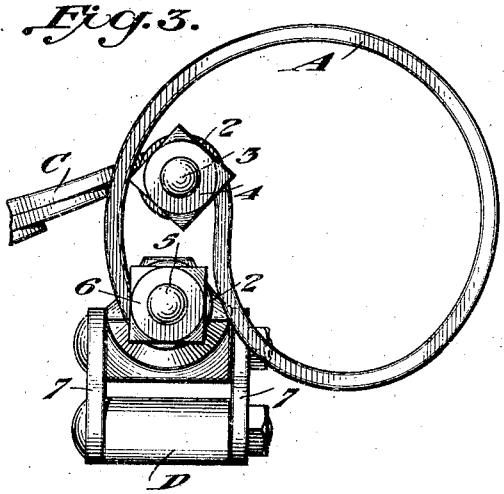
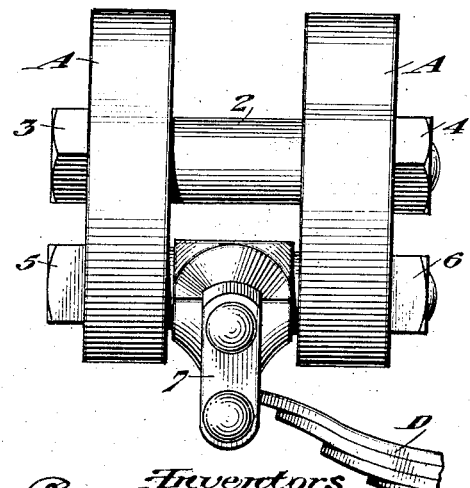

UNITED STATES PATENT OFFICE.

ROBERT P. CLARK AND WILLIAM H. CLARK, OF FRESNO, CALIFORNIA.

AUXILIARY SPRING FOR USE ON AUTOMOBILES.

1,094,305.  Specification of Letters Patent. Patented Apr. 21, 1914.

Application filed July 22, 1913. Serial No. 780,576.

*To all whom it may concern:*

Be it known that we, ROBERT P. CLARK and WILLIAM H. CLARK, citizens of the United States, and residents of the city of Fresno, county of Fresno, and State of California, have invented a new and useful Improvement in Auxiliary Springs for Use on Automobiles, of which the following is a specification.

Our invention relates to an improvement in shock absorbers, and the object is to provide means for connecting the ends of the springs of a vehicle together.

The connecting means is applicable for connecting the ends of elliptical springs or two semi-elliptical springs together, and for connecting a semi-elliptical spring and a cross bar spring together, so that when any strain is imparted to the springs to cause the springs to vibrate, the vibration will be taken up by the connecting means, which will be compressed by the action of the springs and the shock transmitted to the springs absorbed by the connecting means.

The connecting means consists of two convolute rings, a terminal of a ring connected to one spring, and the other terminal of the spring connected to another spring, so that when any shock or vibration is imparted to the car body, the shock and vibrations will be taken up by the rings and the rebound of the car body materially minimized. The rings, being of convolute form, are caused to wind closer together, so that the diameter of the rings is decreased when any shock or vibration is transmitted to the springs, thereby causing the springs to be maintained in practically their normal position, which is not possible with the ordinary shackle connection of the springs.

The invention relates to still other novel features of construction and combinations of parts which will be hereinafter more fully described and pointed out in the claims.

In the accompanying drawings: Figure 1 is a view in side elevation showing the invention applied to a set of springs; Fig. 2 is a top plan view; Fig. 3 is a view in side elevation showing the invention applied to another form of spring; and Fig. 4 is an end view.

A represents two springs, made in the form of convolute rings, the ends or terminals of each convolute ring passing the other. Formed at each end of a ring are annular bearings 2, 2. These rings are connected to semi-elliptical springs B and C. An end of each ring A is connected to the lower semi-elliptical spring C by means of shackle bolts 3, and nuts 4, and the other terminals of the two rings A are connected to the semi-elliptical or laminated spring B by means of shackle bolts 5 and nuts 6.

In the modifications shown in Figs. 3 and 4, the spring C is connected to a spring D. The spring B in this instance is omitted, the shackle bolt 5 having a swivel hanger 7 connected thereto, which hanger is connected to the spring D.

From the foregoing it will be seen that by the lapping of the ends of the convolute rings, any vibrations or shocks received by the springs would cause the spring rings to be wrapped tighter together so that the diameter of the rings will be decreased, and there will not be a distension or elongation of the rings.

The annular bearings 2 formed at the ends of each ring are located in a vertical plane, that is, the bearing or eye 2 of one of the terminals is directly over the bearing or eye of the other terminals, so that the ends of the rings are brought as closely together as is possible.

We claim:

1. The combination with two springs, of a spring ring having overlapping ends, one terminal of the ring connected to an end of one of the springs, and the other terminal of the ring connected to the end of another spring, so that when any vibration or shock is transmitted to the springs, the spring ring will be caused to be convoluted, thereby decreasing the diameter of the ring.

2. The combination with two springs, of two spring rings having overlapping ends, an end of one of the springs having an end of each of the rings connected thereto, and the other spring having the other terminals of the rings connected thereto, so that the ends of the rings are in a vertical plane, said rings convoluted when a strain or shock is transmitted to the springs whereby the diameter of the rings is decreased.

ROBERT P. CLARK.
WILLIAM H. CLARK.

Witnesses:
MADGE BUCK,
T. R. THOMSON.